April 22, 1924.　　　　　　　　　　　　　　　1,490,936
E. V. MYERS
MECHANICAL MOVEMENT
Filed March 20, 1922

INVENTOR
Eugene V. Myers,
By Attorneys,
Fraser, Turk & Myers.

Patented Apr. 22, 1924.

1,490,936

UNITED STATES PATENT OFFICE.

EUGENE V. MYERS, OF EAST ORANGE, NEW JERSEY.

MECHANICAL MOVEMENT.

Application filed March 20, 1922. Serial No. 545,054.

*To all whom it may concern:*

Be it known that I, EUGENE V. MYERS, a citizen of the United States of America, residing in East Orange, in the county of Essex and State of New Jersey, have invented certain new and useful Improvements in Mechanical Movements, of which the following is a specification.

This invention relates to an improved mechanical movement adapted for various uses. For the purpose of illustration it is herein disclosed as applied to a piano movement and also as applied to a hammer. Other applications will be obvious.

This application is a continuation in part of my prior application, Serial No. 226,367, filed April 3, 1918, the same having resulted in Patent No. 1,410,111 of March 21, 1922, for improvements in brakes, the invention herein disclosed being an alternative species of the generic invention disclosed and broadly claimed in the said prior application.

The invention comprises in general three movable elements pivotally connected to each other, and to a fixed element or support. The three movable elements and the fixed element constitute a four link mechanism. These links are pivotally connected in pairs, and each link of each pair is pivotally connected to one of the links of the other pair. The links of each pair are of equal length, but the links of one pair are longer than those of the other pair. Although in different applications of the mechanism any one of the four links might be used as the fixed link or support, the illustrations herein disclosed are based upon a use of one of the longer elements as the fixed member. In the applications of the mechanism herein illustrated as examples, one of the shorter elements of the mechanism is used as a driving element and one of the longer elements as a driven element. When so used, the rotation of the driving element through a part of a rotation may cause the driven element to rotate at a constantly increasing speed ratio until the driving element, the driven element and the connecting link lie parallel with each other and with the line through the points of pivotal connection between said driving and driven elements, and the support, after which the driven element may remain at rest while the driving element and connecting link may continue to rotate about a common axis without further movement relative to each other. If this movement of the driving element and link is continued for more than one half a complete rotation, the relation of parallelism between the various elements of the mechanism may be broken, after which the driving element will first rotate the driven element in one direction, and then, at a constantly increasing speed ratio, in the opposite direction until the above-mentioned relation of parallelism is again effected. Instead of continuing the rotation of the driving element after it passes through its position of parallelism with the driven element, its direction of rotation may be reversed and the direction of parallelism may be broken by imparting to the driven element a slight initial movement at the instant the parallel relation is established. This may be effected by the use of a spring, or by a lug on one element of the mechanism to engage one of the other elements thereof.

In the drawings illustrating the preferred form of the invention and applications of its use,—

Referring first to Figs. 1 to 6, inclusive, A is the driving element and B the driven element, connected with each other by the link C. The driving and driven elements are pivotally connected at O and O', respectively, with a fixed support represented by the broken line D, which may be regarded as the fourth element of the mechanism. The length of the arm $a$ of the driving element A is equal to the length $c$ of the link C, between its points of pivotal connection with the driving and the driven elements A, B. The arm $b$ of the driven element B is equal in length to the distance $d$ between the points of pivotal connection O, O' of the driving and driven elements A, B with the support D.

Figure 1:
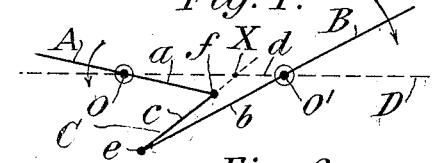

If the driving element A, as viewed in Fig. 1, be rotated in a counter clockwise direction as indicated by the arrow, the driven element B will be rotated in the opposite direction through the intermediary of the link C in a constantly increasing speed ratio.

Referring again to Fig. 1, if the line through the points of pivotal connection of the link C with the elements A, B be extended until it intersects the line passing through the points O, O', it may be shown that for any position of the mechanism except when all of its elements are in parallelism, the speed ratio of the element B with respect to the element A is equal to the length O, X divided by the length O' X.

Figure 2:
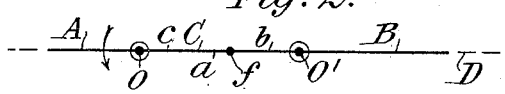

As the mechanism is moved from the position indicated in Fig. 1 to that indicated in Fig. 2, the point X will constantly move toward the right, thereby indicating that the speed ratio of the element B to the element A is constantly caused to increase up to the time that the parts of the mechanism assume the positions indicated in Fig. 2, at which time the elements A, B, C all lie in parallel lines, which are also parallel with the line through the points O, O'. With the parts of the mechanism in these relative positions, the pivotal connection e between the link C and the element B is coaxial with the pivotal connection O between the element A and the support D.

Figure 3:
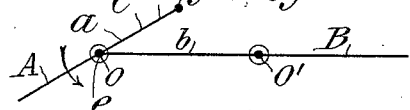

After the parts of the mechanism have reached the relative positions illustrated in Fig. 2, the driven element B may be retained in its position in parallelism with the line through the points O, O', without in any manner interfering with further rotation of the driving element A, and during such further rotation of the element A the link C will rotate therewith, the two members moving as a common element about a common axis through the point O, as indicated in Fig. 3. This further rotation may be continued independently of the movement of the element B throughout one half of a complete revolution of the driving element.

Figure 5:
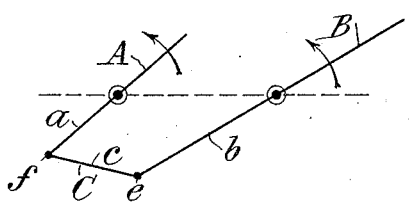
Figures 1 to 6 are diagrams of the mechanism illustrating the different positions of its parts at different stages while the driving element is caused to make one complete revolution.
Figure 4:
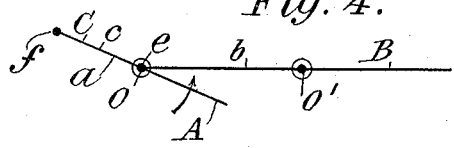

As the driving element continues to rotate in a counter clockwise direction, it and the link C will again be brought into parallel relation with the element B, at some position intermediate those indicated in Figs. 4 and 5, and when this particular relation is again established the parallel relation may be broken if a slight initial movement is imparted either by the use of a spring or gravity, or other appropriate means, so that the various parts of the mechanism will be caused to assume the position indicated in Fig. 5. Further rotation of the driving element A will cause the parts of the mechanism to pass through the positions indicated in Fig. 6 back to the position indicated in Fig. 1.

Figure 6:
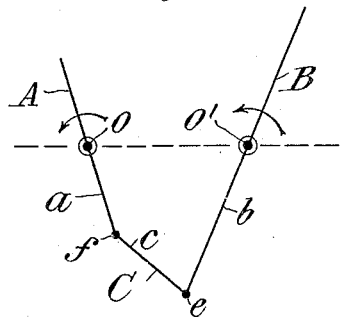

It will be observed that during the movement of the driving member from its position of parallelism in which the arm a is directed away from the point O' to that in which it is directed towards the point O', the element B is first rotated in a counter clockwise direction, as indicated in Figs. 5 and 6, until the element A and the link C assume a position of alignment at a position intermediate those indicated in Figs. 6 and 1, after which the element B is driven in a clockwise direction at a constantly increasing speed ratio until it reaches its maximum speed of rotation when the relationship of parallelism shown in Fig. 2 is effected.

It will be apparent from the foregoing description that this mechanism affords a highly efficient means for gradually imparting kinetic energy to a moving body, at the same time permitting the driving element to be released from said body at the moment at which the maximum amount of energy has been imparted thereto. In other words, the driven element B, which has a zero velocity of rotation at some position between the positions illustrated in Figs. 6 and 1, is caused to have a relatively high velocity when it reaches the position illustrated in Fig. 2, even though the driving element A be rotated uniformly. The energy stored in the driven element B may be made use of to great advantage in any mechanism in which it is desired to impart a blow without causing any reaction to be exerted upon the driving elements of the mechanism which are perfectly free at the time the blow is delivered.

When used as a part of a hammer action, as heretofore suggested, the reaction at the time the blow is imparted serves as a means for bringing the driven element B to rest, at the point indicated in Fig. 2, while the element A and link C move on. Theoretically, in the absence of such action, the inertia would tend to cause the driven element B to continue its rotation, so that the parts would assume a position after passing through the relation of parallelism indicated in Fig. 2, to positions which would be symmetrical with that illustrated in Fig. 1, instead of assuming the positions indicated in Fig. 3. In practice, however, it is found that no such action takes place, even though the element B is free to continue its rotation. In view of the constant acceleration of the element B during the movement of the driving element A from its Fig. 1 position to its Fig. 2 position, and the amount of distortion which takes place when the elements are in the position illustrated in Fig. 2, it is found that the driving element A gains a slight lead over its theoretical position so that the point f crosses the line between O, O' slightly before the point e comes in register with the point O. This slight lead of the driving element and link C is sufficient to lock the driven element B in the position indicated in Fig. 3, and it will remain locked in this position unless the slight initial movement is imparted thereto as the driving element A and link C again pass through the relation of parallelism therewith.

Figure 7:
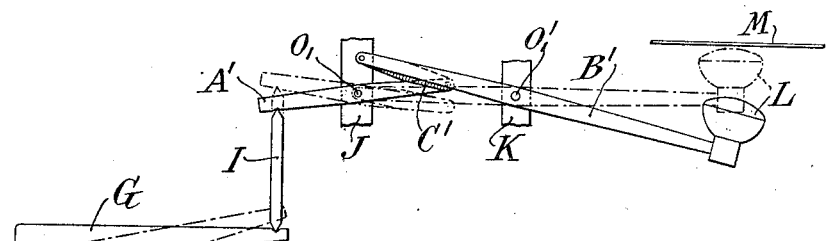
Fig. 7 is a conventional illustration of the mechanism, used as part of a piano action.
Figure 8:
Fig. 8 is a top view of a portion of the same.

In Fig. 7 the mechanism is illustrated conventionally as applied to a piano action. In this figure, depression of the key G causes the same to rotate about its fulcrum H, and thereby through the intermediary of a thrust bar I to rock the driving element A' pivotally connected at $O_1$ to a support J, and thereby through the intermediary of the link C' to rotate the hammer lever B' pivoted at $O'_1$ to a support K, and cause the hammer L to strike the wire M. The parts are so proportioned that the hammer will make contact with the wire when the hammer lever is substantially in line with the points of pivotal connection O, $O'_1$. After the hammer makes contact with the wire a slight further depression of the key may cause the driving element A' to continue its movement independently of the hammer, as indicated in broken lines. On release of the key the weight of the hammer, supplemented by the action of a spring if desired, will cause the parts to be restored to their normal positions.

Figure 9:
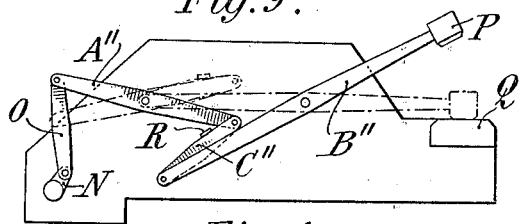
Fig. 9 is a conventional view of the mechanism, used to operate a hammer.

Fig. 9 is a conventional view illustrating the mechanism as applied to a hammer. In this view the driving element A'' is caused to be reciprocated from the position indicated in full lines to that indicated in dotted lines, by a crank N connected therewith through the intermediary of a link O. This reciprocation of the driving element A'' causes the hammer lever B'' and the connected hammer P to be rotated from its full line position to the position indicated in broken lines. As indicated in the drawing, after the hammer P strikes the anvil Q, the driving element A'' is permitted to move on to the position indicated in broken lines. In order that the hammer may be again elevated after the driving element A'' is returned to its position of parallelism with the hammer lever, the link C'' may be provided with a forwardly projecting lug R, which engages the top of the hammer lever when the elements A'', C'' and B'' are parallel with each other, and imparts a slight initial movement to the hammer lever which breaks the relation of parallelism, after which the hammer may be elevated by means of the elements A'', C''.

The applications herein illustrated and described are intended to be suggestive only of many uses for which the invention is suited, and which may be modified in accordance with the skill and the taste of the designer within the scope of the appended claims.

What I claim is:

1. A mechanical movement comprising two pairs of pivotally connected elements, each element of each pair being also pivotally connected to one of the elements of the other pair, the arms between pivotal connections of the elements of each pair being of equal length, and the arms between pivotal connections of one pair being longer than those of the other, said connections and the positions of said arms as to their relative planes of movement being so disposed that the axes of the two pivotal connections between elements of different pairs may be brought into alinement.

2. A mechanical movement comprising a fixed element, two movable elements pivotally connected therewith, and a link pivotally connected with each of said movable elements, the arm between the pivotal connections of one of said movable elements being equal in length to the distance between the two pivotal connections of said fixed element, and the length of the arm between the pivotal connections of the other of said movable elements being less than that of the first but equal to the distance between the two pivotal connections of said link, said connections and the positions of said arms and link as to their relative planes of movement being so disposed that the axis of the connection between the longer arm and the link may be brought into alinement with the axis of the connection between the shorter arm and the fixed element.

3. A mechanical movement comprising a fixed support, a driving element, and a driven element each having crank arms pivoted to said support, and a link connecting said crank arms, the length of the crank arm of said driven element being equal to the distance between the pivotal connections of said crank arms with said support, and the length of the crank arm of said driving element being equal to the length of said link and less than the length of the arm of said driven element, said link and crank arms being disposed in different parallel planes, the planes of said link and of said driving crank arm lying between the planes of said driven crank arm and said support, whereby said link and connected arms may be moved into parallelism with the axis of the connection between the link and the driven element in alinement with the axis of the connection between the driving element and the support, after which the link and the driving element may be moved as a unit about a common axis while the driven element remains at rest.

4. A mechanical movement comprising a fixed support, a driving element and a driven element each having crank arms pivoted to said support, and a link connecting said crank arms, said link and crank arms being so disposed as to their relative planes of movement and being so proportioned and related as to their relative lengths and their points of connection with said support that a limited movement of said driving element may cause said link and said crank arms to be moved into a relation of parallelism, after which said driving element and said link may be rotated as a unit about a common axis while said driven element is held fixed.

5. A mechanical movement comprising a fixed support, a continuously rotatable driving element and a driven element each having crank arms pivoted to said support, and a link connecting said crank arms, said link and crank arms being so disposed as to their relative planes of movement and being so proportioned and related as to their relative lengths and their points of connection with said support that rotation of said driving element through part of a complete revolution may first cause said link and crank arms to be brought into a relation of parallelism, with the axis of the connection between said driven element and said link in alinement with the axis of the connection between said driving element and said support, after which the driven element may remain at rest while the driving element and said link may rotate as a unit through the remaining part of said complete revolution, said last mentioned element and link turning about the pivotal connection between said element and support as a common axis.

6. A mechanical movement comprising a fixed support, a driving element and a driven element each having crank arms pivoted to said support, and a link connecting said crank arms, said link and crank arms being so disposed as to their relative planes of movement and being so proportioned and related as to their relative lengths and their points of connection with said support that a limited movement of said driving element may cause said link and said crank arms to be moved into a relation of parallelism, after which said driving element and said link may be rotated as a unit about a common axis while said driven element is held fixed, one of the movable elements of said mechanism being provided with a lug to engage another of said elements on reverse rotation of said driving element and link and thereby impart an initial rotation to said driven element as said link and said elements return through their relation of parallelism.

In witness whereof, I have hereunto signed my name.

EUGENE V. MYERS.